United States Patent
Bussiere et al.

(10) Patent No.: US 7,581,249 B2
(45) Date of Patent: Aug. 25, 2009

(54) DISTRIBUTED INTRUSION RESPONSE SYSTEM

(75) Inventors: Richard Bussiere, Andover, MA (US); Mark Townsend, Andover, MA (US); Steven Pettit, Andover, MA (US); David Harrington, Andover, MA (US); John Roese, Andover, MA (US); Richard Graham, Andover, MA (US)

(73) Assignee: Enterasys Networks, Inc., Andover, MA (US)

( * ) Notice: Subject to any disclaimer, the term of this patent is extended or adjusted under 35 U.S.C. 154(b) by 286 days.

(21) Appl. No.: 10/713,560

(22) Filed: Nov. 14, 2003

(65) Prior Publication Data

US 2005/0108568 A1  May 19, 2005

(51) Int. Cl.
  G06F 11/00 (2006.01)
  G06F 21/00 (2006.01)
(52) U.S. Cl. ............... 726/22; 726/23; 726/11; 726/12; 726/13; 713/189
(58) Field of Classification Search .......... 726/23, 726/11, 12, 13, 22; 713/89, 189
  See application file for complete search history.

(56) References Cited

U.S. PATENT DOCUMENTS

| | | |
|---|---|---|
| 4,993,024 A | 2/1991 | Quinquis et al. |
| 5,251,205 A | 10/1993 | Callon et al. |
| 5,390,173 A | 2/1995 | Spinney et al. |
| 5,406,260 A | 4/1995 | Cummings et al. |
| 5,490,252 A | 2/1996 | Macera et al. |
| 5,608,726 A | 3/1997 | Virgile |

(Continued)

FOREIGN PATENT DOCUMENTS

WO  WO 9957625 A1 * 11/1999

(Continued)

OTHER PUBLICATIONS

Kashiwa, D et al., Active Shaping: A Countermeasure Against DDoS Attacks; European Conference on Universal Multiservice Networks, ECUMN, XP-002998979, Apr. 8, 2002, pp. 171-179.

(Continued)

*Primary Examiner*—Christopher J Brown
(74) *Attorney, Agent, or Firm*—Verrill Dana, LLP; Chris A. Caseiro

(57) ABSTRACT

A system and method to respond to intrusions detected on a network system including attached functions and a network infrastructure. The system includes means for receiving from an intrusion detection function information about intrusions, a directory service function for gathering and reporting at least the physical and logical addresses of devices of the network infrastructure associated with the detected intrusions, and a plurality of distributed enforcement devices of the network infrastructure for enforcing policies responsive to the detected intrusions. A policy decision function evaluates the reported detected intrusions and makes a determination whether one or more policy changes are required on the enforcement devices in response to a detected intrusion. A policy manager function configures the distributed enforcement devices with the responsive changed policy or policies. Policy changes rules can vary from no change to complete port blocking on one or more identified enforcement devices associated with the detected intrusion, to redirecting the associated traffic including the intrusion and these policies may be modified or removed over time as warranted by network operation.

27 Claims, 2 Drawing Sheets

U.S. PATENT DOCUMENTS

| | | | |
|---|---|---|---|
| 5,991,881 A * | 11/1999 | Conklin et al. | 726/22 |
| 6,088,804 A * | 7/2000 | Hill et al. | 726/25 |
| 6,128,665 A | 10/2000 | Iturralde | |
| 6,147,995 A | 11/2000 | Dobbins et al. | |
| 6,167,137 A | 12/2000 | Marino et al. | |
| 6,321,338 B1 * | 11/2001 | Porras et al. | 726/25 |
| 6,388,992 B2 | 5/2002 | Aubert et al. | |
| 6,456,624 B1 | 9/2002 | Eccles et al. | |
| 6,560,236 B1 | 5/2003 | Varghese et al. | |
| 6,708,212 B2 * | 3/2004 | Porras et al. | 709/224 |
| 6,789,202 B1 * | 9/2004 | Ko et al. | 726/23 |
| 2001/0049744 A1 | 12/2001 | Hussey et al. | |
| 2002/0018571 A1 | 2/2002 | Anderson et al. | |
| 2002/0087687 A1 | 7/2002 | Zaifman et al. | |
| 2002/0090089 A1 | 7/2002 | Branigan et al. | |
| 2002/0129264 A1 * | 9/2002 | Rowland et al. | 713/200 |
| 2003/0014662 A1 | 1/2003 | Gupta et al. | |
| 2003/0023774 A1 * | 1/2003 | Gladstone et al. | 709/328 |
| 2003/0046583 A1 * | 3/2003 | Goldman et al. | 713/201 |
| 2003/0110393 A1 | 6/2003 | Brock et al. | |
| 2003/0149888 A1 * | 8/2003 | Yadav | 713/200 |
| 2003/0188189 A1 | 10/2003 | Desai et al. | |
| 2004/0003285 A1 * | 1/2004 | Whelan et al. | 713/201 |
| 2004/0025044 A1 * | 2/2004 | Day | 713/200 |
| 2004/0049693 A1 | 3/2004 | Douglas | |
| 2004/0111636 A1 * | 6/2004 | Baffes et al. | 713/201 |
| 2004/0215972 A1 * | 10/2004 | Sung et al. | 713/201 |
| 2004/0255157 A1 * | 12/2004 | Ghanea-Hercock | 713/201 |

FOREIGN PATENT DOCUMENTS

| | | |
|---|---|---|
| WO | WO 03/047158 | 6/2003 |

OTHER PUBLICATIONS

Chen, E. Y., Aegis: An Active-Network-Powered Defense Mechanism Against DDoS Attacks, Proceeding of IWAN 2001, LNCS 2207, Oct. 2001, pp. 1-15, Springer-Verlag, Berlin DE.

* cited by examiner

DISTRIBUTED INTRUSION RESPONSE SYSTEM

BACKGROUND OF THE INVENTION

1. Field of the Invention

The present invention relates to systems and methods for responding to intrusion events detected in a network system. More particularly, the present invention relates to a distributed system of intrusion response by enabling network policy allocation through a plurality of network infrastructure devices.

2. Description of the Prior Art

Computing systems are useful tools for the exchange of information among individuals. The information may include, but is not limited to, data, voice, graphics, and video. The exchange is established through interconnections linking the computing systems together in a way that permits the transfer of electronic signals that represent the information. The interconnections may be either cable or wireless. Cable connections include, for example, metal and optical fiber elements. Wireless connections include, for example infrared, acoustic, and radio wave transmissions.

Interconnected computing systems having some sort of commonality are represented as a network. For example, individuals associated with a college campus may each have a computing device. In addition, there may be shared printers and remotely located application servers sprinkled throughout the campus. There is commonality among the individuals in that they all are associated with the college in some way. The same can be said for individuals and their computing arrangements in other environments including, for example, healthcare facilities, manufacturing sites and Internet access users. A network permits communication or signal exchange among the various computing systems of the common group in some selectable way. The interconnection of those computing systems, as well as the devices that regulate and facilitate the exchange among the systems, represent a network. Further, networks may be interconnected together to establish internetworks. For purposes of the description of the present invention, the devices and functions that establish the interconnection represent the network infrastructure. The users, computing devices and the like that use that network infrastructure to communicate are referred to herein as attached functions and will be further defined. The combination of the attached functions and the network infrastructure will be referred to as a network system.

The process by which the various computing systems of a network or internetwork communicate is generally regulated by agreed-upon signal exchange standards and protocols embodied in network interface cards or circuitry and software, firmware and microcoded algorithms. Such standards and protocols were borne out of the need and desire to provide interoperability among the array of computing systems available from a plurality of suppliers. Two organizations that have been responsible for signal exchange standardization are the Institute of Electrical and Electronic Engineers (IEEE) and the Internet Engineering Task Force (IETF). In particular, the IEEE standards for internetwork operability have been established, or are in the process of being established, under the purview of the IEEE 802 committee on Local Area Networks (LANS) and Metropolitan Area Networks (MANs).

The identified organizations generally focus on the mechanics of network and internetwork operation, less so on rules and restrictions on access to, and the provisioning of services associated with, the network. Presently, access to applications, files, databases, programs, and other capabilities associated with the entirety of a discrete network is restricted primarily based on the identity of the user and/or the network attached function. For the purpose of the description of the present invention, a "user" is a human being who interfaces via a computing device with the services associated with a network. For further purposes of clarity, a "network attached function" or an "attached function" may be a user connected to the network through a computing device and a network interface device, an attached device connected to the network, a function using the services of or providing services to the network, or an application associated with an attached device. Upon authentication of the offered attached function's identity, that attached function may access network services at the level permitted for that identification. For purposes of the present description, "network services" include, but are not limited to, access, Quality of Service (QoS), bandwidth, priority, computer programs, applications, databases, files, and network and server control systems that attached functions may use or manipulate for the purpose of employing the network as an asset. The basis upon which the network administrator grants particular permissions to particular attached functions in combination with the permissions is an established network usage policy. For example, one policy may be that any user (one type of attached function) with an employee identification number is granted access to the enterprise's electronic mail system at a specified bandwidth and QoS level.

Typically, the network administrator establishes policies. The policies may be defined in and regulated through a policy server controlled by the administrator. The established policies are transmitted to and enforced by the devices of the network infrastructure, typically at the entry connection points or ports. As part of the authentication process and access process, a particular set of policies are established by the administrator for an attached function. That is, the port at which that attached function is connected to the network infrastructure is configured to effect those policies. For example, QoS, bandwidth, and priority levels may be set at certain values for one identified attached function and at different levels for another attached function. Once that set of policies has been established for that attached function, there is typically no coordinated mechanism to revise the set of policies at any time during network connection based on a change of circumstances.

Unfortunately, events and activities do occur that may be harmful to the network system. For purposes of this description, harm to the network system includes, for example, access denial, intentionally tying up network computing resources, intentionally forcing bandwidth availability reduction, and restricting, denying, modifying, or gaining access to data or services. There are currently two generally available forms of network protection designed to minimize such types of network harm: firewalls and Intrusion Detection Systems (IDS). Firewalls are designed to prevent the passage of packets to the network based on certain limited specific conditions associated with the packets. Firewalls do not permit packet passage for the purpose of further analysis nor do they enable assigned policy modifications. IDS are designed to observe the packets, the state of the packets, and patterns of usage of the packets entering or within the network infrastructure for harmful behavior. However, the available IDS do not prevent packet entry to the network infrastructure. Further, for the most part, they only alert a network administrator to the existence of potentially harmful behavior but do not provide an automated response to the detected occurrence. There is some limited capability to respond automatically to a detected intrusion. However, that capability is static in nature in that the response capability is ordinarily restricted to limited devices of the network infrastructure and the response is pre-defined, there being no option to respond in a dynamic fashion to multiple network infrastructure devices.

For the most part, existing IDS, whether network-based (NIDS), host-based (HIDS) or a combination of the two (NIDS/HIDS), are centrally configured. That is, all detected potentially harmful occurrences are transferred to a central processing function for analysis and, if applicable, alarm reporting. The detection functionality may reside in one or more devices associated with one or more network infrastructure devices. Each device provides its own report to the central processing function with respect only to those packets passing to it. The central processing function then conducts the analysis and the alarm reporting.

Upon receipt of an alarm, the network administrator may do nothing or manually adjust the state of the entire network infrastructure or a particular network infrastructure device in response to the detected occurrence. That process takes a relatively significant amount of time, with the response delay potentially allowing increasingly greater harm to the network system as the occurrence continues. If a response is effected, it may result in a much more widespread restriction on network usage, due to the limited number of select entry ports, than is warranted by the actual occurrence. Further, the use of a centralized processing function is a potential problem in that a failure of the central function affects the entire network infrastructure.

Therefore, what is needed is an improved IDS that provides a rapid response to detected occurrences for which a response is required. Further, what is needed is such an improved IDS that employs a greater portion of the network infrastructure for detection and response. Further, what is needed is a system that enables response, preferably automated response, to detected occurrences in a more focused or granular manner than has heretofore been employed. Yet further, what is needed is such a response system that minimizes the impact on the network infrastructure as a whole when a failure occurs in any one portion of the system.

SUMMARY OF THE INVENTION

The present invention is a Distributed Intrusion Response System (DIRS) for enforcement of policies associated with network usage based on detection of identified events or occurrences deemed suitable for triggering such enforcement. The DIRS is configured to enable that policy enforcement at any suitable network infrastructure device without requiring the device to have advanced knowledge of the particular policies to enforce or the attributes of the intrusion causing the policy enforcement. Further, the DIRS is configured such that the network administrator is not required to know in advance which network infrastructure device is to be used to respond to an intrusion occurrence. In effect, the DIRS enables all network infrastructure devices to be intrusion response devices as means to enforce policies associated with network usage security. That is, no prior knowledge is required of the particular network infrastructure device that will respond in an on-the-fly arrangement rather than a static, hardwired one. Any network device may be considered a network security enforcement device. That distributed arrangement results in a web of security protecting all aspects of the network system.

The response generated by the DIRS may be generated at a network entry device, by a centralized network infrastructure device, or a combination thereof. The response may be a single response action generated by a single device, it may be a combination of actions generated by one or more devices, including entry and core devices, or it may be a set of serial or parallel responses generated by one or more such devices. For example, a detected intrusion of the network may produce a response resulting in a change of policy at the network entry device where the intrusion was detected. Alternatively, the detected intrusion may trigger a response involving policy changes at one or more network entry devices including or not including the network entry device where the intrusion was detected. In another alternative, the detected intrusion may trigger a response involving policy changes only at one or more centralized devices, or some combination of entry and centralized devices. Further, the response may involve a series of stepped responses, such as first directing an intruder to perform some activity and, if not completed, then initiating one or more additional policy changes. It is contemplated that policy changes may include timed changes, such as making a policy change at one or more devices and, if no further triggering conditions are observed over a specified period of time, converting the changed policy back to its origin or some other, possibly less restrictive, policy. The response may be a calculated response created based upon the triggering condition, or it may be a set response automatically generated based on a particular type of triggering condition.

The DIRS of the present invention interacts with, and enables acting upon information from, an IDS or intrusion detection function, whether that function is established in hardware, firmware, software, or any combination thereof, for network monitoring. (For purposes of this invention, an intrusion of the network infrastructure may enter the network infrastructure from an attached function or it may be generated within the network infrastructure.) One example of a suitable intrusion detection function is the Dragon™ Intrusion Defense System offered by Enterasys Networks, Inc., of Andover, Mass. The intrusion detection function must be able to detect and report identified occurrences deemed by the network administrator to be network security threats. The DIRS may operate through a policy manager function, which function may be established in hardware, firmware, software or any combination thereof, directly or indirectly connected to the intrusion detection function and configured to regulate network infrastructure device policies.

The DIRS includes one or more distributed network infrastructure enforcement devices directly or indirectly connected to the policy manager function and with the capability to be configured to enforce security, usage, and/or network access policies managed by the policy manager function. The network infrastructure devices having the enforcement function include one or more physical or logical connection points or ports through which policies are enforced. As indicated, those policies may be enforced at a network entry device, a centralized network infrastructure device, or a combination thereof. As a result, enforcement may be established at any network infrastructure device provisioned with the enforcement function. Centralized responses to triggering conditions are no longer required. Human intervention may continue to form part of the response strategy, but not exclusively so.

For effective implementation of distributed policy enforcement response to detected intrusions, the DIRS preferably also includes a directory service function, either contained within the DIRS or accessible via one or more external interfaces from the DIRS to a shared management service, to map the physical and logical locations of all network infrastructure devices, including the distributed enforcement devices. Each of the enforcement devices preferably includes the capability to provide to the directory service function its physical location information, its logical location information, its OSI layer 2/MAC address information, its OSI layer 3/network address information, and its OSI layer 2 to layer 3 mapping information for the device itself or all attached functions and transit signal traffic. That information may be stored locally on the devices themselves, or it may be stored centrally (in a single device or in a distributed manner), such as in a network management server that may or may not include, or be a part of, the policy manager function.

The DIRS provides improved dynamic response to detected intrusions in a much more focused manner than has been achieved in prior detection and rudimentary response methods. That is, policy enforcement may be enabled only at the point or points of intrusion rather than network wide, unless that broader approach is specifically desired. This granular enforcement is primarily enabled at network entry devices but may also be implemented at other network infrastructure devices that may be centrally located. Policy enforcement may occur at the network infrastructure entry devices as well as at centralized internal devices. As a result, detected intrusions may be more quickly barred from spreading throughout the network infrastructure, thereby minimizing harm to the network system as a whole. It is also possible that the DIRS may dampen rather than eliminate the activity of the offending or potentially offending source or sources. That would enable subsequent auditing and gathering of forensic evidence without allowing the source or sources to impact the network system adversely or significantly. The dampening function would simply be one form of policy alternative to a complete denial or shutting off policy and that form of response may be driven by the assessment of the harm or potential harm to the network system. Where the potential harm or threat is high, the DIRS may isolate fully the source or sources but where the DIRS determines that the threat is slow moving or relatively low, a dampening policy may be preferable so that connectivity is not fully prohibited.

Focused responses to detected intrusions may include, but are not limited to, disablement of particular transport protocols (e.g., TCP, OSI Layer 4/Transport), logical addresses (e.g., IP, OSI Layer 3/Network), or physical addresses (e.g., OSI Layer 2/MAC) active in the detected intrusion, or other such protocols or addresses that may be involved in an intrusion, all without disabling other protocols or addresses not involved in the intrusion. That selective disablement may be part of a static policy arrangement (e.g., a static policy that in all instances where virus type A is detected, specified transport protocol X is immediately disabled), a dynamic policy arrangement (e.g., if a particular server access has been detected and a particular port has been probed, then packets on the probed port may be monitored or diverted to a honeypot), or a combination of the two. Further description of static and dynamic policy provisioning is described in pending U.S. patent application Ser. No. 10/629,331, filed Jul. 29, 2003, entitled "System and Method for Dynamic Network Policy Management" and assigned to common assignee Enterasys Networks, Inc. The contents of that application are incorporated herein by reference.

The response method achieved with the DIRS of the present invention involve the following steps, all or a portion of which may be used to establish a focused response in a rapid manner. The steps include upon receiving information regarding a triggering event or condition, such as an intrusion alarm from an intrusion detection function, a) identifying the source or sources of the intrusion or intrusions; b) identifying one or more enforcement devices to respond to the intrusion or intrusions; and c) implementing a response at the one or more identified devices. The method further optionally includes the step of verifying the legitimacy/accuracy of address information associated with the identified source or sources of the detected intrusion(s). The method further includes the optional step of reporting the detected intrusion(s) and the generated response to the network administrator. Detection of intrusions may be achieved using a HIDS, a NIDS, or a combination thereof, such as the Dragon™ Intrusion Defense System of Enterasys Networks, Inc., or some other form of detection capability. The step of identifying the source of the intrusion includes identifying the source address or addresses of the particular detected packet or packets by analysis using the policy manager function or as part of the IDS reporting function. The address identification may be performed locally, through one or more device-to-device interfaces, or via one or more centralized devices or services. The step of determining on which particular network infrastructure device or devices the intrusion packets were received may be made by using existing network management functions. The step of implementing a response may be achieved by transmitting a policy change from the policy manager function to the identified network infrastructure device that acts as a security enforcement device.

For the purpose of this invention description, the DIRS enables a network administrator to establish granular control of network services usage generally, or usage of particular network services specifically, based on intrusions that are detected at any time throughout network operation. An intrusion is any event, activity, occurrence, information or characteristic identified in a network system by the network administrator as being harmful or potentially harmful to the network system, or unauthorized in any way. The intrusion may be generated by an attached function or a network infrastructure device. The types of intrusions that would force a change in policy associated with an enforcement device of the network infrastructure may be of any type of interest to the network administrator. The system configuration can vary and can include any type of voice, data, or voice/data network, including LANs, MANs, Wide Area Networks (WANs), Personal Area Networks (PANs), Virtual Private Networks (VPNs), and Home Networks. The system may be used to improve network usage, control, and security.

The network administrator can configure the DIRS such that, upon detection of an intrusion, any of a selectable number of policies may be directed to one or more of the security enforcement devices. For example, if some form of network virus previously unknown to the network administrator is detected, all attached functions may be forced off the network infrastructure, and then required to re-authenticate and verify the addition of a virus detection function suitable for detecting that newly identified virus prior to re-acquiring full or specific portions of network system usage. Alternatively for example, the identified source port of the identified enforcement device may simply be disabled with respect to a specific transport protocol for a specified period of time or until a particular corrective action occurs.

In one aspect of the invention, a method is provided for responding to the detection of an intrusion on a network system that provides network services, the network system including one or more attached functions and network infrastructure. It includes the steps of identifying the source or sources of an intrusion or intrusions, identifying one or more network infrastructure enforcement devices to which the identified source(s) is/are attached, and configuring the identified network infrastructure enforcement device(s) with one or policy changes responsive to the detected intrusion(s). The method also includes the step of configuring one or more of the enforcement devices to report their physical and logical address information to a policy change function. The response function is initiated upon receiving information from a centralized or distributed intrusion detection function. The step of identifying the one or more intrusion sources includes the optional step of verifying the one or more addresses of the one or more identified sources via the network infrastructure devices to which they are directly or indirectly attached. For example, a network entry device may be queried for the current state of a specific address or its current address lists and the lists compared with the intrusion source(s) information. The source address(es) information may also be verified through a combination of entry and central device queries or addresses lists.

In another aspect of the invention, a system is provided to respond to the detection of an intrusion on a network system that provides network services, the network system including one or more attached functions and a network infrastructure. The system includes means for receiving information from one or more intrusion detection functions. The system includes a directory service function including address information for devices of the network system. It also includes means for receiving provisioning information from a policy manager function that provisions devices of the network infrastructure with policies. One or more network devices of the system are configured to report address information to the directory service function, and to enforce policy changes established thereon by the policy manager function in response to detected intrusions. The system further includes a policy decision function configured to receive detected intrusion information from one or more intrusion detection functions, to receive network infrastructure device information from the directory service function, to evaluate whether a policy change or changes is or are required on one or more of the security enforcement devices in response to the detected intrusion information, and to direct the policy manager function to configure identified devices with determined policy changes upon deciding to do so based upon the evaluation. The policy manager function and the policy decision function are preferably part of a central policy server of the network infrastructure, but not limited thereto. In addition, the one or more enforcement devices may be any one or more of any combination of routers, switches, access points, gateways, and firewalls or other devices of the network infrastructure. A network management system may be employed to identify address information for the network security enforcement devices, and that network management system preferably communicates with the intrusion detection function.

In another aspect of the invention, there is an article of manufacture comprising a machine-readable medium that stores executable instruction signals that cause a machine to perform the method described above and related methods described herein.

The details of one or more examples related to the invention are set forth in the accompanying drawings and the description below. Other features, objects, and advantages of the invention will be apparent from the description and drawings, and from the appended claims.

DETAILED DESCRIPTION OF PREFERRED EMBODIMENTS OF THE INVENTION

Figure 1:
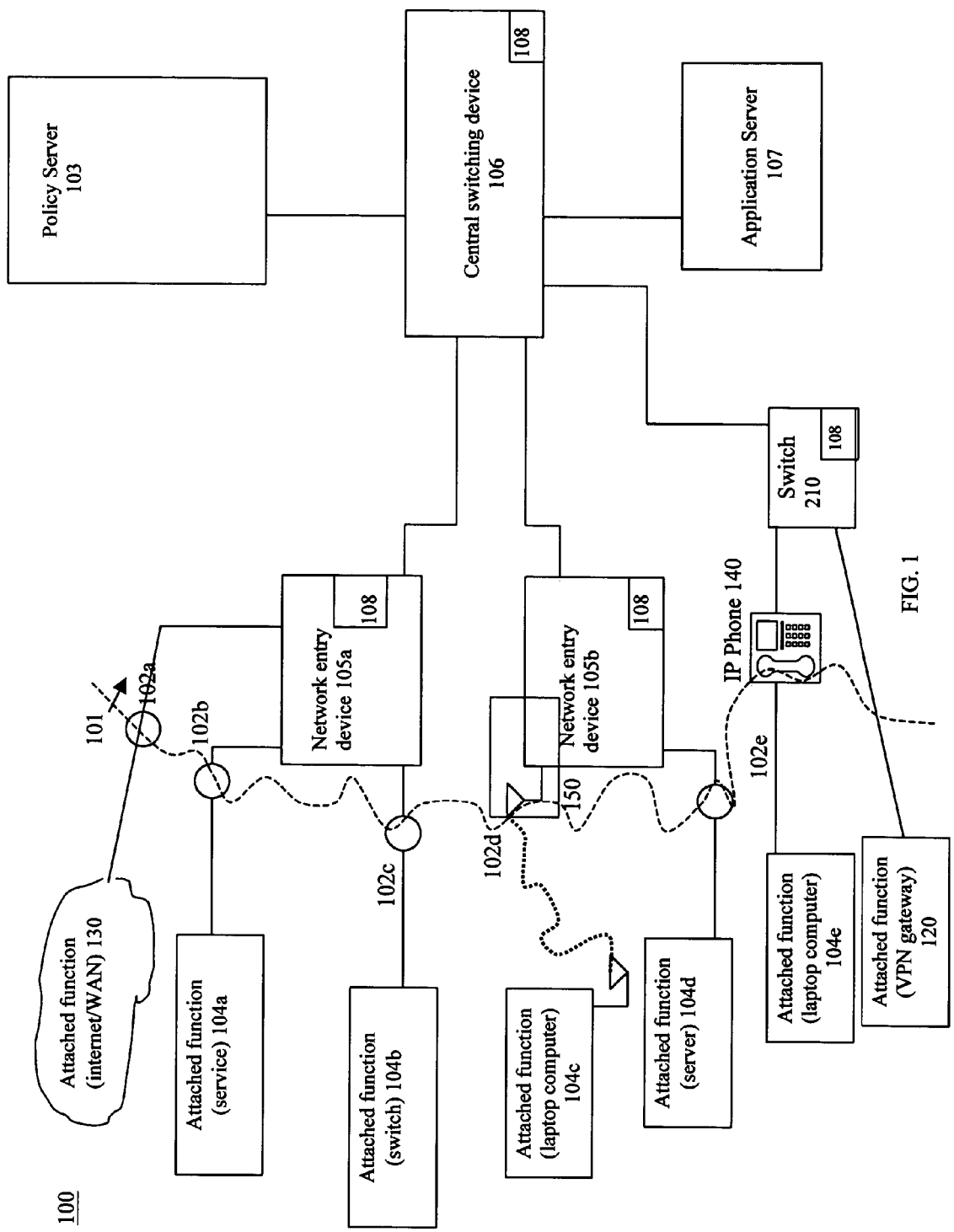
FIG. 1 is a simplified diagrammatic block representation of an example network system with the DIRS of the present invention.

The present invention is a system and related method to detect and respond, in a distributed and dynamic manner, to intrusions associated with the operation of a network system. Referring to FIG. 1, a network system 100 incorporating the capability of the Distributed Intrusion Response System (DIRS) of the present invention operates and provides network services to attached functions according to policies assigned to the attached functions. Network system 100 includes a network infrastructure 101 and one or more attached functions connected to or connectable to the network infrastructure 101. The network infrastructure 101 may include any or all of the following: switching devices, routing devices, firewalls, access points, MANs, WANs, voice interconnect systems, VPNs, and internet connectivity interconnected to one another and connectable to the attached functions by way of connection points. The DIRS of the invention employs both hardware and software (e.g., a function embodied in an application executing on policy server 103) to manage responses at network infrastructure devices to intrusions detected throughout the entire network system 100 at all times as described below.

An attached function is external to infrastructure 101 and forms part of network system 100. Examples of attached functions 104a-104e are represented in FIG. 1, and may be any of the types of attached functions previously identified. Network infrastructure entry devices 105a-b of infrastructure 101 provide the means by which the attached functions connect or attach to the infrastructure 101. A network entry device can include and/or be associated with a wireless access point 150. For wireless connection of an attached function to the infrastructure 101, the wireless access point 150 can be an individual device external or internal to the network entry device 105b. It is to be understood that in some cases, an attached function may be part of the network infrastructure. For example, VPN gateway 120 may be connected to one or more remotely located computers for access to network services and may therefore be considered part of the network infrastructure 101. Similarly, phone 140 with IP functionality as a switching device may be a network entry device for an attached function connected by wire or wirelessly. For the purpose of illustrating the response system of the present invention, a plurality of the network infrastructure devices, except phone 140, include the enforcement function. However, that device may include such functionality. It is to be understood that the network system 100 may include other network entry devices without the enforcement function, that one or more centralized network infrastructure devices, such as centralized switch 106, may include the enforcement function, or there may be a combination of network entry and centralized forwarding devices having the enforcement function of the present invention. The enforcement function regulates access to network services, including, for example, applications available through application server 107.

One or more of the devices of the infrastructure 101 may include a responsive dynamic policy enforcement module 108. For purposes of illustration, network infrastructure devices 105a-b, 106, and 210 illustrated in FIG. 1 include such a module. However, it is to be understood that in a comprehensive network infrastructure, not all signal transferring devices may include such a module. Any network infrastructure device including such an enforcement module will be referred to herein as a network policy enforcement device or a network security enforcement device or just a network enforcement device. The enforcement module 108 includes an information providing function and a policy enforcement function.

The information providing function provides device information associated with that particular infrastructure device and any attached functions connected directly or indirectly to it. That device information may be stored or cached locally or in a more centralized manner. In a preferred embodiment of the invention, the device information is provided to a central directory service in a manner to be described herein. Alternatively, a network infrastructure device such as central switch device 106 may provide that information directly to the policy server 103. Further, the directory server function may be embodied in the policy server 103 or another central device controlled by the network administrator. The enforcement function puts into effect the set of policies responsive to an intrusion detected by an Intrusion Detection System (IDS) function (not shown), and assigned to the device by the policy server 103.

The enforcement module 108 of any particular device of the infrastructure 101 may include any one or both of the two identified functions. It is contemplated that the policy server 103 under control of the network administrator will have primary responsibility for decision making of assigning and modifying sets of policies, but that device information reporting and policy enforcement in particular, are distributed functions. However, it is also contemplated that some decision making and policy assignment function may be established in the module 108 of a network device. That is, for example, module 108 of central switching device 106 may include a policy assignment function and modules 108 of network entry devices 105a-c may have information reporting and enforcement functions for the attached functions to which they are connected. In addition, as indicated, there may be network devices that have no enforcement module 108. Instead, such "dumb" devices may simply provide packet exchange functionality only and leave combinations of reporting, assigning, and enforcement functions for their connections to other devices of the infrastructure 101.

The information providing, policy assignment, and enforcement functions may include algorithms and processes necessary to identify information about attached functions and devices, provide that information, enforce sets of assigned policies, and make decisions regarding assigned policies. Module 108 can be implemented in hardware and/or software. For example, particular software, firmware, or microcode functions executing on the network infrastructure devices can provide the information providing functions, policy enforcement as presently available in network infrastructure devices, and policy assignment decision making. Alternatively, or in addition, hardware modules, such as programmable arrays or ASICs, can be used in the devices to provide some or all of those capabilities. Further, the intrusion detection function may be implemented by any commercially available IDS, including the Dragon™ Intrusion Defense System provided by Enterasys Networks, Inc. of Andover, Mass. While the IDS may be a standalone appliance, it may alternatively be embodied in part or in full in one or more other devices of the network infrastructure 101.

Access by an attached function to the network services associated with network system 100 includes a setting of static and/or dynamic policies, referred to generally as a set of policies, for the attached function. Sets of policies are established by the network administrator. Information regarding an attached function seeking or having access to network services and the sets of policies may be stored centrally or in a distributed manner, including being stored locally. In an example of a centralized approach, the policying system of the present invention stores attached function and policy set information for all of the connection points of the network system 100 in a server such as policy server 103. In an example of a distributed approach, the policying system stores attached function and policy set information for all attached functions, or a portion of the attached functions, in one or more of the local network devices 105a-b and 106 of the network infrastructure 101.

A preliminary process for network entry by an attached function includes the initial steps of the complete process to respond to detected intrusions of the network system 100 throughout the entirety of a network session. The entry process may be started using conventional entry methods upon attached function initiation of a network entry request such as by booting up a network entry device or initiating a connection to a network entry device at a connection point using a computing device such as a computer. The network control system then initiates attached function authentication methods.

Entry to the network system 100, and the infrastructure 101 primarily, may be initially regulated using authentication systems such as Network Operating Systems (NOSs), Remote Authentication Dial-In User Service (RADIUS), described in IETF Request For Comment (RFC) 2138, and IEEE 802.1X standard, which provides for port-based network entry control based on a MAC identifier. Firewalls also provide a technique for network entry regulation based on their packet analysis functionality previously described.

In addition to acquiring the attached function information necessary to authenticate access to the network services, the policying system is preferably configured, or forms part of a system, that directly or indirectly obtains any further additional information identified by the network administrator as being of importance in assessing relevant policies and for establishing the mechanism for responding to detected intrusions for which policy changes may be required. Such further additional information includes, but is not limited to, attached function physical (MAC) address, attached function logical address, and attached function physical/logical address binding, attached function location, attached function configuration, attached function operating system, attached function security features, user location, and network entry port information.

Based upon information obtained using standard authentication and any additional attached function information observation or query, a determination is made of the attached function's permission to access network services. If the information acquired is authenticated or otherwise accepted, the attached function enters the network usage control process of the invention. If either the authentication information or the additional attached function information is insufficient to permit preliminary network entry (e.g., a password is incorrect or the user's identified location is not known), network entry is restricted or denied.

Figure 2:
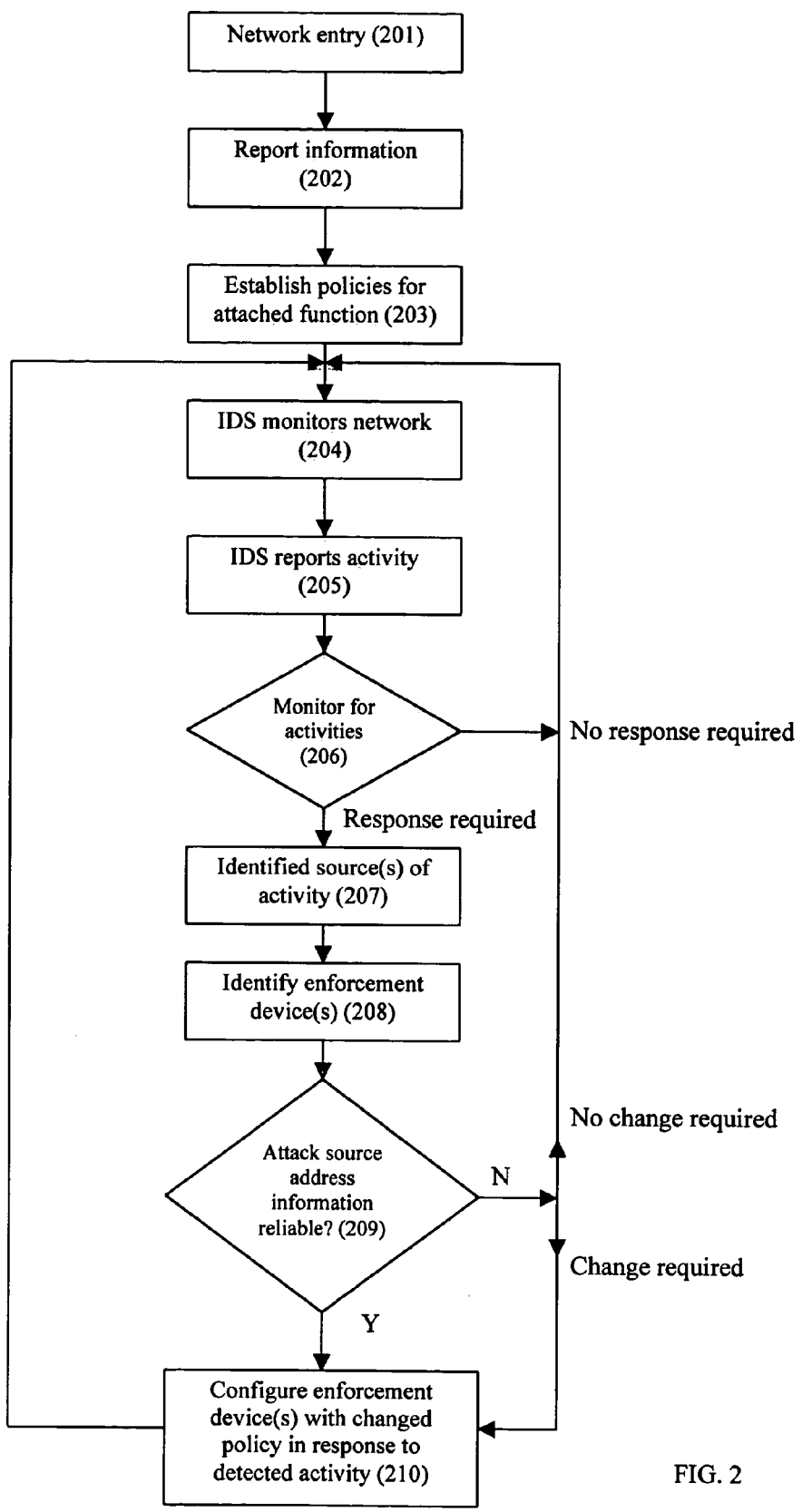
FIG. 2 is a flow diagram of the process for detecting intrusions, identifying the source of the detected intrusion, identifying one or more network infrastructure devices suitable for responding to the detected intrusion and configuring the one or more identified devices with one or more policies suitable to respond to the intrusion.

With reference to FIG. 2 and intrusion response process 200, upon the granting of preliminary entry to the network infrastructure 101 and the gathering of information associated with that attached function (step 201), the information is reported to the directory service, and includes information relating to specific identification of the network entry device to which that attached function is attached (step 202). Policies for that attached function are then established and applied, typically, at the network entry device or centralized switching device to which the attached function is directly or indirectly connected (step 203).

Throughout network system operation, the intrusion detection function monitors the network infrastructure 101 for activities, events, or occurrences that may be considered to be unusual or out of the ordinary (step 204). Upon detection of noteworthy or potentially noteworthy activity, the intrusion detection function makes a report to the policy server 103 or other suitable intrusion detection function (step 205) in a manner corresponding to the reporting process associated with the IDS of choice. The reported information may include information identifying the source or sources of an intrusion or intrusions. The information provided by the intrusion detection function (or by other means, such as a node alias table) includes the address(es) of one or more sources of the packet(s) associated with the detected activity. As those skilled in the art of intrusion detection operations understand, the information reported by the intrusion detection function may be generated by a single device or by a plurality of devices. Further, the information gathered may be associated with activity involving one or more network infrastructure devices, one or more attached functions or any combination thereof. The information related to any one network infrastructure device or any one attached function may not of itself be considered related to noteworthy activity; however, a combination of disparate events or occurrences may result in a response trigger, such as in the case of a distributed network attack.

The system of the present invention is further configured to enable the network administrator to monitor the information reported by the intrusion detection function that are defined by the network administrator as triggers for changing, or evaluating whether to change, the static/dynamic policy set initially established (step 206). Monitoring of the network system 100 preferably includes monitoring of all intrusion reports and may further include monitoring for other selectable events, activities or occurrences. Monitoring is conducted on some or all attached functions, some or all of the network infrastructure 101 devices, some or all of the intrusion detection function, or combinations thereof. In effect, the monitoring is a continuous observation of all network activity as well as identified external events that the administrator may wish to have considered, including the time of day, for example.

In addition to the available intrusion reporting function, a great number of mechanisms exist for automatically monitoring network links, L2 topologies, L3 topologies and the status and utilization of ports and attached functions. Remote monitoring (RMON) tools and Simple Network Management (SNMP) Management Information Bases (MIBs) are useful and valuable methods to collect the information about network infrastructure devices, attached functions, links, network state and status, to provide input into creating the events to trigger policy changes. They may also be used to learn address information for attached functions that are sources of intrusions, and address information for network infrastructure devices associated with such attached functions. For purposes of this description, association means the direct or indirect wired or wireless connection of an attached function to a network infrastructure device. Further, input ports on access switches and routers may be capable of classifying traffic based on all layers of the ISO (International Standards Organization) seven layer Architecture model. Activities may be monitored on a port by port basis yet many are better suited to a distributed model with local and remote inputs. The Netsight™ Atlas™ network management tool offered by Enterasys Networks, Inc. of Andover, Mass. may be suitable for that purpose. It is contemplated that the IDS function, the network management tool, or both include one or more application program interfaces for collecting the attached function and enforcement device information and for querying the directory service for response requirements.

If the reported activity is determined to be insufficient to require a change of policies associated with the network infrastructure 101, the system permits continued and ongoing intrusion monitoring without any policy changes. However, if the intrusion detection function indicates that an intrusion response is required, the intrusion detection function contacts the directory service with the address or addresses of the source or sources of the captured packet(s) (207). The address information may be a Layer 2 address such as a MAC address, a Layer 3 address, such as an IP address, or preferably a combination of both. It is to be understood that an intrusion source may have one or more of each type of address. The directory service provides information sufficient to identify one or more enforcement devices to which the identified source or sources is/are attached (step 208). The address information may be a Layer 2 address such as a MAC address, a Layer 3 address, such as an IP address, or preferably a combination of both. It is to be understood that an enforcement device may have one or more of each type of address, each of which may or may not be associated with the detected intrusion. The DIRS then determines if the reported address (es) for the identified source(s) is/are legitimate, either by querying the network management system to confirm the authenticity of the identified address, by testing for its presence using a technique such as an SNMP get-and-respond exchange, or by some other means of address identification verification (step 209).

With continuing reference to FIG. 2, upon verification of the reliability of the address(es) of the identified source(s), one or more policy enforcement changes may or may not be made at the identified one or more enforcement devices, other network infrastructure devices, or a combination thereof. If the determined source address(es) cannot be verified, one or more policy enforcement changes may be made throughout the network, at one or more potentially likely enforcement devices, or any combination thereof (step 210). This determination preferably resides with the policy manager function rather than made locally so as to ensure policy assignment consistency. The change policy(ies) are applied to a port or ports of the identified enforcement device or devices.

The policy manager function modifies policy for an enforcement device in a distributed manner by sending control information to the identified enforcement device or devices (i.e., by SNMPv3) such that some or all of the following may be accomplished: 1) further network access by or through the device is blocked completely (i.e. MAC address filter is installed; 2) access by the IP address (only) is blocked (L3 filter installed); 3) access or use of the offending protocol is denied (e.g., L7, L2/L4 or L3/L4 protocol is blocked); 4) limit bandwidth from, to, or from and to the device; 5) direct traffic to a honeypot or other monitoring device; and 6) direct traffic to a simulation device, such as a simulated network, or other methods. Policy changes may also include removing a policy change made, either automatically or periodically. Further, it may involve conducting a test as to whether the triggering condition remains and, if so, keeping the policy in effect, and if not, removing the change policy. Also as previously noted, the enforcement response may be an incremental set of responses. For example, making a minimal policy change and then examining whether that change has resolved the triggering condition. If not, an increased or broader policy change may be enabled and the result re-tested. It is to be understood that the policy change may be associated with ingress into a port or ports of a network infrastructure device, egress from a port or ports of a network infrastructure device, or messaging through the network infrastructure to an attached function. The Netsight™ Atlas™ network management product offered by Enterasys Networks, Inc. of Andover, Mass., including the User Personalized Network™ policy provisioning functionality thereof, may be suitable for that distributed policy change control function.

As noted, the present system and related method employ a centralized policy server 103 that includes the policy manager function and the intrusion response function and may further include the directory service. It may also include a policy information database. That functionality may alternatively be distributed throughout the infrastructure 101. On the other hand, the information reporting and enforcement functions are preferably distributed. As described below, for a distributed system example, devices both inside and outside network infrastructure 101 can optionally maintain policy information that affects their operation. Relatedly, the policy information may be stored in the centralized policy server 103, distributed, or stored or cached locally for rapid access and access permissions established by the designated policies.

FIG. 1 shows the dynamic policy function modules 108 as components of the devices of the infrastructure 101 for illustration purposes only. The information representing the one or more reporting and/or enforcement functions associated with a particular network device, or one or more network devices attached to a particular network device, may be preloaded into module 108 in the form of a reporting and enforcement database. The reporting and enforcement database at each device can be the entire reporting and enforcement database of network system 100, or a portion of that database. In particular, the portion of the database included in the module 108 of the device can be a portion associated with those connection points applicable to that particular device. For example, all of the connection points associated with the ports of a particular network entry device. Module 108 may include a table of policy change triggers and assigned policies sets that is an updateable table that changes with additions or deletions of attached functions information, network infrastructure devices information, detected intrusions, and static and dynamic policies. Additionally, a table of actual policy designations is preferably generated and may be stored or cached locally and called upon for subsequent sessions based on attached function information.

The following is a list of a few possible devices (but not limited to only those devices) that may contain the policy server and/or any one or more of the reporting and enforcement functions: network switches, data switches, wireless access points, routers, firewalls, gateways, computing devices such as network file servers or dedicated usage servers, management stations, network connected voice over IP/voice over data systems such as hybrid PBXs and VoIP call managers, network layer address configuration/system configuration servers such as enhanced DHCP servers, enhanced Bootstrap Protocol (bootp) servers, IPv6 address auto-discovery enabled routers, and network based authentication servers providing services such as RADIUS, extensible authentication protocol/IEEE 802.1X or others.

As indicated above, in order to distribute policy changes to enforcement devices, network system 100 may employ SNMP. A network administrator provisions the policy information of the terminus of a network cable associated with the attached function in the SNMP ifDescr variable (e.g., the ifDescr is a read only attribute, but many systems allow a network operator to "name" a port, which then will be displayed in this field). The module 108 of a network infrastructure device reads the terminus information via the SNMP. In another example MIB parameters may be established or used to obtain and configure the table of information, the intrusion triggers, and the policing options. MIBs may also be employed to populate the table of dynamic and static historical information for storage and/or caching.

Other variations of the above examples can be implemented. One example variation is that the illustrated processes may include additional steps. Further, the order of the steps illustrated as part of processes is not limited to the order illustrated in their figures, as the steps may be performed in other orders, and one or more steps may be performed in series or in parallel to one or more other steps, or parts thereof. For example, the IDS and trigger monitoring steps may be performed in parallel.

Additionally, the processes, steps thereof and various examples and variations of these processes and steps, individually or in combination, may be implemented as a computer program product tangibly as computer-readable signals on a computer-readable medium, for example, a non-volatile recording medium, an integrated circuit memory element, or a combination thereof. Such computer program product may include computer-readable signals tangibly embodied on the computer-readable medium, where such signals define instructions, for example, as part of one or more programs that, as a result of being executed by a computer, instruct the computer to perform one or more processes or acts described herein, and/or various examples, variations and combinations thereof. Such instructions may be written in any of a plurality of programming languages, for example, Java, Visual Basic, C, or C++, Fortran, Pascal, Eiffel, Basic, COBOL, and the like, or any of a variety of combinations thereof. The computer-readable medium on which such instructions are stored may reside on one or more of the components of system 100 described above and may be distributed across one or more such components.

A number of examples to help illustrate the invention have been described. Nevertheless, it will be understood that various modifications may be made without departing from the spirit and scope of the invention. Accordingly, other embodiments are within the scope of the claims appended hereto.

What is claimed is:

1. A method of responding to the detection of an intrusion on a network system that provides network services, the network system including one or more attached functions and a plurality of interconnection devices, the method comprising the steps of:
   a. providing means for one or more attached functions to connect to one or more of a plurality of interconnection devices of the network system;
   b. acquiring information about the attached functions seeking access to the network services;
   c. determining whether one or more stored policies exist for the attached functions;
   d. allowing at least one of the one or more attached functions to access a selectable portion of the network services based on a policy established in one or more of the interconnection devices;
   e. monitoring the network system for intrusions;
   f. excluding from at least one of the plurality of interconnection devices a policy enforcement module for effecting its own signal transfer policy changes;

g. including in at least one of the plurality of interconnection devices the capability for such interconnection device to change directly its own signal transfer policies;
h. upon detection of one or more intrusions of the network,
   i. determining a physical address or a logical address for each attached function associated with the source of the intrusion; and
   ii. identifying one or more interconnection devices having a policy enforcement module and used by the identified attached function or functions to gain access to the network services;
i. selectively changing one or more signal transfer policies of one or more of the plurality of interconnection devices in response to the one or more detected intrusions; and
j. saving changed policies for the one or more attached functions.

2. The method as claimed in claim 1 wherein the physical address information is a MAC address or the logical address information is an IP address.

3. The method as claimed in claim 1 further comprising the step of employing an intrusion detection device of the network system to perform the function of detecting the one or more intrusions, wherein the intrusion detection device is either a centralized network system device, a plurality of distributed network system devices or a combination of both.

4. The method as claimed in claim 1 wherein the step of identifying the interconnection device used by the attached function includes the step of determining the physical address, logical address, or both for the interconnection device.

5. The method as claimed in claim 1 further comprising the step of verifying the identification of the identified source of the intrusion.

6. The method as claimed in claim 1 wherein the step of selectively changing one or more signal transfer policies of one or more of the plurality of interconnection devices in response to the one or more detected intrusions includes the step of configuring the one or more interconnection devices to perform one or more functions selected from the group consisting of: blocking complete access to the network services by an identified source of a detected intrusion, blocking access by identified logical addresses only, blocking access by an identified access protocol only, limiting bandwidth, limiting exchanges to or from the one or more interconnection devices, to or from one or more other devices of the network system, or to or from any of the attached functions not identified as an intrusion source, and directing all signals exchanged by the identified sources to a honeypot, an intrusion detection device, a monitoring device, or a simulation device.

7. The method as claimed in claim 1 wherein the step of selectively changing one or more signal transfer policies of one or more of the plurality of interconnection devices in response to the one or more detected intrusions includes the step of configuring the one or more interconnection devices to permit connectivity of an identified source of a detected intrusion while dampening the level of activity associated with the identified source to minimize network harm while permitting analysis and auditing of the identified source and the gathering of forensic evidence.

8. The method as claimed in claim 1 wherein the step of selectively changing one or more signal transfer policies of one or more of the plurality of interconnection devices in response to the one or more detected intrusions includes the steps of first configuring a first set of the one or more interconnection devices with a first set of one or more policy changes, monitoring the network system for intrusions and, upon detection of one or more intrusions related to the intrusions causing the first one or more policy changes, configuring a second set of the one or more interconnection devices with a second set of one or more policy changes.

9. The method as claimed in claim 8 wherein one or more of the one or more interconnection devices of the second set are interconnection devices of the first set.

10. The method as claimed in claim 1 wherein the one or more interconnection devices are network entry devices.

11. The method as claimed in claim 1 wherein the one or more signal transfer policy changes are configured on one or more ports of the identified interconnection devices associated with the source of the intrusion.

12. The method as claimed in claim 1 further comprising the step of verifying the identification of the identified source of the intrusion.

13. A network system including a plurality of attached functions, and the network system including the capability to respond to intrusions thereof, the network system comprising:
   a. an intrusion detection function for identifying one or more sources of one or more intrusions of the network system;
   b. a plurality of interconnection devices for transferring signals through the network system, wherein each of the plurality of interconnection devices includes one or more signal transfer policies, wherein at least one of the plurality of interconnection devices includes the function to change directly its own signal transfer policies;
   c. a function of a policy enforcement module to change selectively the signal transfer policies of one or more of the plurality of interconnection devices in response to the one or more detected intrusions, wherein at least one of the plurality of interconnection devices excludes the policy enforcement module to establish therein the function to change selectively its own signal transfer policies;
   d. means to connect one or more attached functions to one or more of the plurality of interconnection devices;
   e. a function to determine whether a stored policy history exists for the one or more attached functions;
   f. one or more policies established on one or more of the interconnection devices to allow at least one of the one or more attached functions to access a selectable portion of the network services;
   g. a function to determine a physical address or a logical address for the attached function or attached functions identified by the intrusion detection function as the source or sources of the one or more intrusions;
   h. a function to identify the one or more interconnection devices having the policy enforcement module and used by the one or more identified attached functions to gain access to the network services; and
   i. a function to save modified policies for the one or more attached functions.

14. The network system as claimed in claim 13 further comprising a directory service function for receiving address information for the attached functions and the interconnection devices.

15. The network system as claimed in claim 14 further comprising a policy manager function for configuring the plurality of interconnection devices with the signal transfer policies.

16. The network system as claimed in claim 15 further comprising a policy decision function configured:
   a. to receive detected intrusion information from the intrusion detection function;

b. to receive information from the directory service function;

c. to evaluate whether a policy change or changes is or are required on one or more of the interconnection devices in response to the detected intrusion information; and d. to direct the policy manager function to configure one or more of the plurality of interconnection devices with determined policy changes upon deciding to do so based upon the evaluation.

17. The network system as claimed in claim 16 wherein the policy manager function and the policy decision function are part of a centralized server.

18. The network system as claimed in claim 17 wherein the directory service function is part of the central server.

19. The network system as claimed in claim 13 wherein the intrusion detection function is a centralized intrusion detection function or a distributed intrusion detection function.

20. The network system as claimed in claim 13 wherein the one or more of the plurality of interconnection devices selected for signal transfer policies changes are network entry devices selected based on their local connection to the one or more sources of the one or more intrusions.

21. The network system as claimed in claim 13 further comprising a network management system for identifying address information for the plurality of interconnection devices.

22. The network system as claimed in claim 13 further comprising a function to validate the accuracy of the identity of the identified one or more sources including a logical address, a physical address, or a location.

23. The method as claimed in claim 1 wherein the identified attached function gains access to the network services through one of the interconnection devices to which it is directly connected.

24. The method as claimed in claim 1 further comprising the step of establishing one or more policies for the one or more attached functions without communicating with a centralized policy server.

25. The network system as claimed in claim 13 wherein the one or more identified attached functions gain access to the network services through one of the interconnection devices to which they are directly connected.

26. The network system as claimed in claim 13 wherein the policy enforcement module is configured to establish one or more policies for one or more of the one or more attached functions without communicating with a centralized policy server.

27. The method as claimed in claim 1 wherein the at least one of the plurality of interconnection devices further includes an intrusion detection function.

* * * * *